Feb. 27, 1951   M. M. ROSSITER   2,543,302
HAY LOADER ATTACHMENT
Filed April 6, 1948   2 Sheets-Sheet 1

Millard M. Rossiter
INVENTOR.

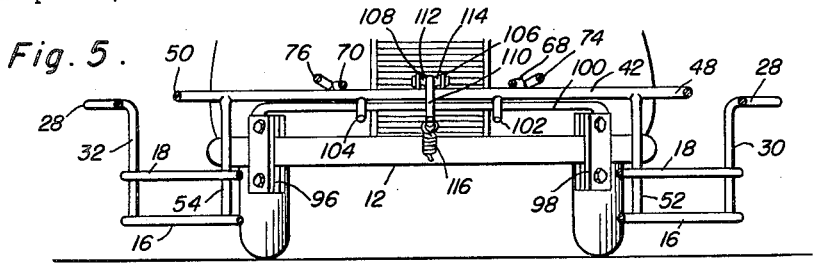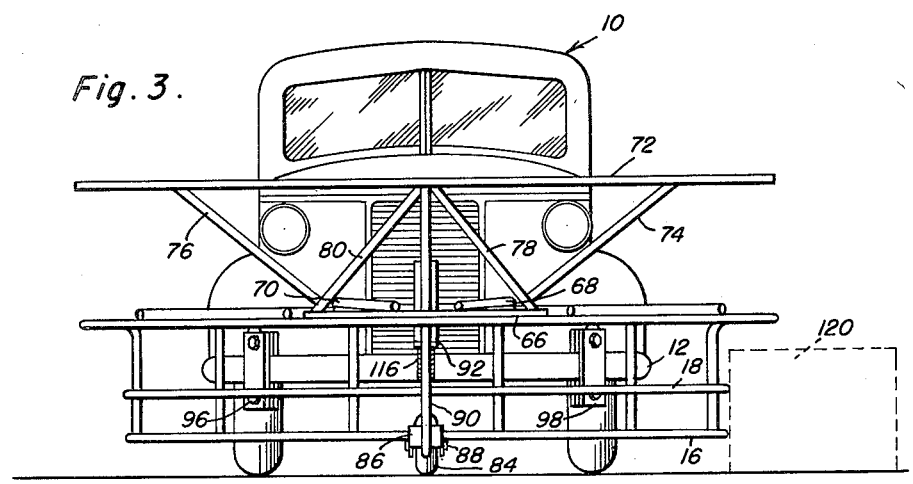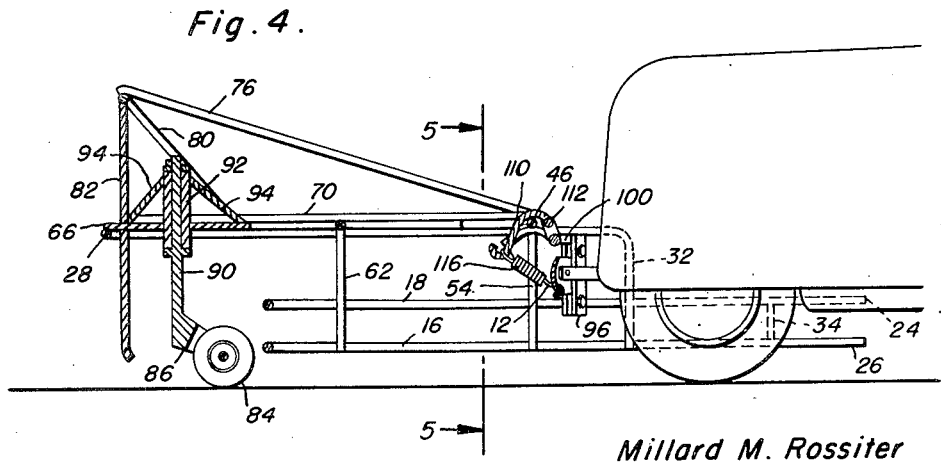

Patented Feb. 27, 1951

2,543,302

UNITED STATES PATENT OFFICE 2,543,302

HAY LOADER ATTACHMENT

Millard M. Rossiter, Tulare, Calif.

Application April 6, 1948, Serial No. 19,282

7 Claims. (Cl. 214—1)

This invention relates to a bale loading device and more particularly to a guide structure for utilization with a vehicle supported and operated bale loader and has for its principal object to align bales of hay, alfalfa, cotton or the like, which lay scattered and widely dispersed in a field, so that a loader may conveniently and easily pick up the bales.

Another object of this invention is to provide a projecting guide structure, which is designed and adapted for quick and convenient attachment to the front end of a tractor, truck or the like vehicle, to the rear end of which is attached a loading elevator or similar device, so that bales of any type of agricultural product may be adjusted and positioned relative to the loader, whereby the task of removing bales from the field may be facilitated and considerable time and manpower may be conserved during a harvesting operation.

Another object of this invention is to provide a guide or positioning attachment for a loading device, the guide structure being inexpensive and economical to manufacture, convenient and simple to attach to any type of vehicle, and durable and efficient in operation.

These and ancillary objects are attained by this invention, a preferred embodiment of which is set forth in the following description and illustrated in the accompanying drawings, wherein:

Figure 3 is a frontal elevational view of this invention in attachment with a motor vehicle;

Figure 4 is a cross-sectional view taken substantially on the plane of line 4—4 of Figure 1, and;

Figure 5 is a transverse sectional view taken substantially along a plane indicated by the line 5—5 of Figure 4.

Figure 1:
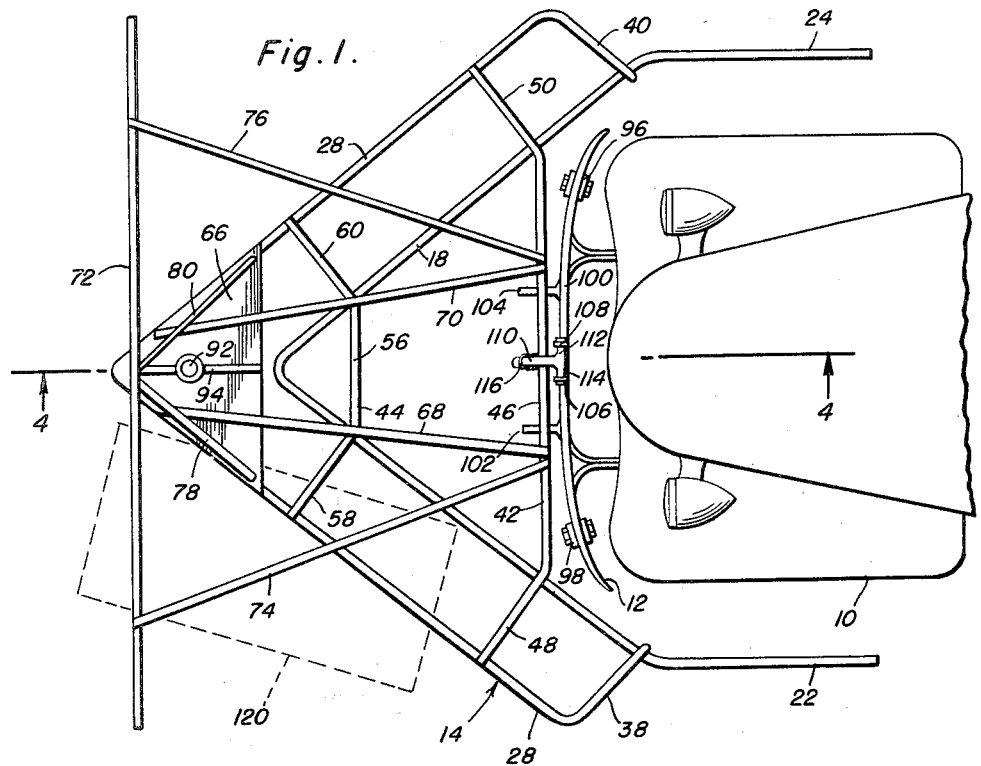
Figure 1 is a plan view showing this invention attached to the front bumper of a motor vehicle.

Conventional devices are now agriculturally employed during harvesting operations in a field of alfalfa, hay or the like produce, whereby the individual stalks are cut and collectively gathered into bales, which are left laying on the field in dispersed positions. Then, a loader is utilized to collect the assembled bales and place them on a truck or similar carrier, so that they may be moved to a suitable storage or aging place. The loading device most commonly employed comprises an elevator or vertical conveyor, which is attached to the side of a truck adjacent the rear thereof and has its rotating movement controlled and operated by the rear wheels of the truck through the medium of a belt transmission system or some such power take-off arrangement. The conveyor picks up the bales, as the truck is driven over the field and places them on the truck. However, the conveyor, being of a width cooperative with the length of the bales must be moved into corresponding alignment with the bales. Frequently, this results in the bales not being picked up but being cast off to the side and the loader must be returned to the spot to effect the collection of the bales not in proper position. Also, it frequently occurs that as the truck drafting the conveyor or loader, is being driven over the field, bales will be in the path of travel of the truck, causing the operation to be discontinued, till the bale is manually removed.

Thus, the primary purpose of this invention is to obviate these shortcomings and defects and to render more convenient and to conserve valuable time and manpower during loading operations by providing a guide structure designed to be detachably secured to the front end of truck so that as the truck is driven over the field the guide structure will move the bales into position and advance them in proper alignment to the loader, where they may be easily collected. Also, another purpose of this invention is to eliminate the delay attendant with the removal of bales from the chassis of the truck by providing a triangular projecting guide structure, detachably secured to the front of the truck and having an angular superstructure, whereby the bales will be met by the nose of the guide and cast off to the side along a guide rail structure and delivered in proper position to the loader.

Referring now more particularly to the accompanying drawings, wherein similar characters of reference designate corresponding parts throughout, 10 designates generally a customary and conventional agricultural motor vehicle or truck having the customary contiguous components. A front bumper 12 extends crosswise of the front of the truck and is securely projected therefrom. Detachably secured to the bumper 12 is a triangular guide frame and superstructure, generally denoted by the character reference 14 and comprising this invention. The frame or structure 14 comprises a pair of vertically spaced V-shaped rails or bars 16, 18, having angularly disposed offset end extensions 20, 22, 24 and 26, which extend parallel with the sides of the truck 10 and are suitably spaced therefrom a distance equal to the offset gauge of the side loader (not shown).

The complementary V-shaped rails 16 and 18 project forwardly from the truck and compose the side structure for the guide device 14. A top guide rail 28 is similarly V-shaped and is disposed and at right angles to the side rails 16 and 18 and is spaced angularly and disposed above the side rails. The top rail 28 has depending terminating sections 30 and 32, which extend to the lower side rail 16 and are suitably attached to the inner surface of the side rails 16 and 18 at a point adjacent the angular juncture of the longitudinally rearwardly extending termini 20, 22, 24 and 26 of the side rails, which are joined together by brace bars 34 and 36, vertically placed therebetween. Suitable means may be employed to effect the connecting or joining of the rails and may include soldering or the like. The depending sections 30 and 32 extend upwardly and are bent at right angles and vertically spaced from the upper side rail 18, thus forming transverse or lateral upper guide rails 38 and 40, which are angularly bent to form the V-shaped top guide rail 28.

Suitable means are provided to rigidify the opposed sides of the V-shaped top rail 28 and include brace bars 42 and 44 of similar shape but of different lengths. Brace bar 42 extends crosswise or transversely between the opposed sides of the V-shaped guide rail 28 at a point forwardly spaced from the transverse upper rails 38 and 40 and includes a substantially transverse medial section 46 having angular end extensions 48 and 50. The medial section 46 extends laterally between and above the opposing sides of the side rails 16 and 18 and the end extensions 48 and 50 project angularly in a direction similar to top guide end bars 38 and 40 and are joined to the opposed sides of V-shaped upper rail 28. Depending from the crosswise brace bar 42 at the angular juncture of the ends 48 and 50 are vertical rib rods 52 and 54, which are connected to the side rails 16 and 18 and serve to maintain the top outwardly extending V-shaped guide rail 28 in proper angular spaced position, so as to define a passageway for a bale between the angular area of the offset side rails 16 and 18 and top rail 28.

Brace bar 44 is of similar description as bar 42 and has a transverse medial section 56, which extends between and above the side rails, at a point adjacent the nose or angular bend of the opposing sides of the V-shaped side rails 16 and 18. Angularly offset ends 58 and 60 spaced from the end extensions 48 and 50 of brace bar 42 project in a plane similar thereto and have their termini suitably secured to the opposing sides of the top rail 28. Likewise, depending rib rods or bars 62 and 64 project from the transverse brace bar 44 at the angular bend of the end extensions 58 and 60 from the medial section 56 and connect the brace bar with the opposing sides of the side rails 16 and 18.

Disposed at the nose portion or angular bend of the opposing sides of top rail 28 is a triangular sheet member or cover section 66, which is attached to and seats on the angular junction between the opposed sides. Longitudinally extending struts 68 and 70 are connected at one end to the medial section 46 of the brace rod 42 and project forwardly in a converging plane to the triangular front cover, where they are suitably joined adjacent the periphery of the opposed sides thereof. The struts 68 and 70 overlie the angular juncture of the terminating offset sections 58 and 60 of brace rails 44.

Overlying the above described V-shaped frame is a superstructure comprising a transverse front bar or rail 72 having its ends laterally projecting to a terminating point in a longitudinal plane parallel to the angular juncture of the cross-wise top rails 38 and 40 relative to the top rail 28. Connected between the front rail 72 and the transverse rail 42 in an inwardly and downwardly extending direction are a pair of opposed struts or braces 74 and 76, suitably joined as by soldering or the like, to the two opposed parallel rails.

Diagonal upwardly extending short struts 78 and 80 support the front crosswise rail 72 in a vertically spaced position from the nose shield 66 and are aided by a vertically extending ground bar 82 which protrudes an equal distance through the nose shield 66 and is attached at its upper end to the front bar.

A front wheel 84 is employed to space the front of the guide structure from the ground and to enable it to be moved easily over the ground and is also attached to an offset U-shaped bracket 86, by an axle pin 88. The bracket 86 is integral with a depending support rod 90 which is swivelly housed in a cylindrical casing 92, inserted through a centrally disposed opening in the nose shield and supported therein by brace rods or bars 94.

Of course, means are provided for detachably attaching the guide structure to the bumper 12 of the motor truck 10 and may comprise any suitable means. However, the means preferred comprises a pair of clamped blocks 96, 98 secured to the bumper and laterally spaced thereon, which support a crosswise extending bar 100, having extending angular lugs 102, 104 formed thereon, upon which is seated the medial portion 46 of the transverse rail or brace bar 42.

Centrally positioned on the support bar 100, in an upright placement are a pair of bracket rings 106 and 108, which are adapted to receive the lateral arms 112 and 114 of an angular connecting pin or hook 110. The depending hook end of the hook 110 has disposed thereon a spring 116 having its opposite end secured to the bumper 12. The transverse brace rail 42 has its medial section 46 seated on the lugs 102 and 104 between the hook 110 and the spring 116.

Thus, by removing the spring and bringing the crossbar 42 into seating engagement with the lugs 102 and 104 and then rehooking the coil or compressed spring 116 to the hook 110, the guide structure is easily attached to the motor truck 10.

Figure 2:
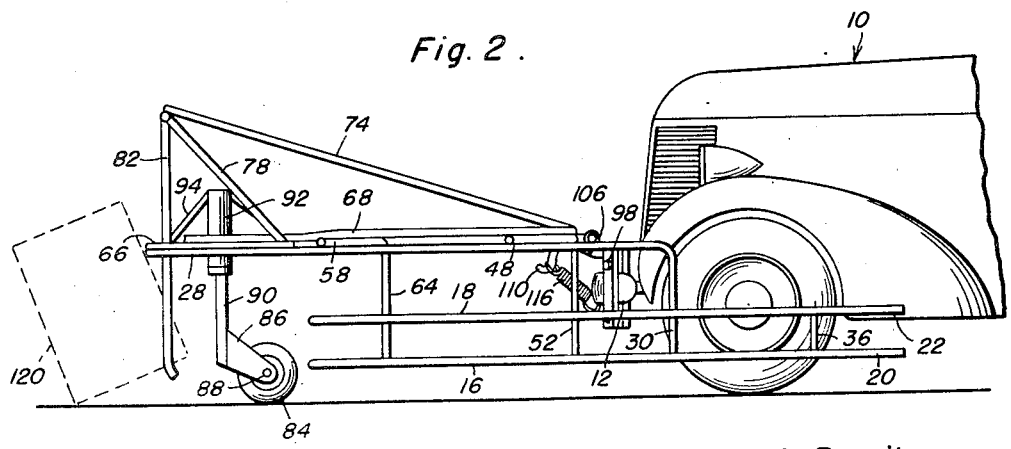
Figure 2 is a side elevational view of a guide structure constructed in accordance with the principles of this invention.

Referring now specifically to Figures 1 and 2, there is exemplified a bale 120, of hay, alfalfa, or the like, which is laying on the field. As the guide structure approaches the bale, the nose shield 66 advances over the bale or if the bale is on end on the ground displaces it to a horizontal position. The front portion of the side rails 16 and 18 then strikes the bale, causing it to be moved off to the side and abut against the side rails, whereby the bale moves between the right angular area between the side rails and top rails. The bale is moved back along the side rails and passes the angular rearwardly projecting sections 20, 22, 24 and 26 of the guide rails, which align the bale correctly with the elevator or loader opening.

Thus, it can be seen that a convenient and efficient means is provided to be quickly and easily attached to an agricultural truck or the like, which supports and operates a bale loading mechanism, whereby a bale may be properly aligned with the loader with a subsequent saving in cost, time and labor.

Since many other purposes and modifications of this invention will become apparent to those skilled in the art upon a perusal of the foregoing description in view of the accompanying drawings, it is to be understood that such imparts nothing by way of limitation, since many changes in style, size and arrangement of parts may be effected without a departure from the spirit of the invention and within the scope of the appended claims.

Having described the invention what is claimed as new is:

1. A device for attachment to a vehicle and for use as a guide for conducting bales to a bale loader comprising a V-shaped frame including a pair of vertically spaced V-shaped side rails having rearwardly projecting parallel ends, a complementary V-shaped top rail disposed at right angles above the side rails, a pair of spaced transverse brace rods having angular and depending end extensions attached to the side rails and top rail, an extending superstructure supported on the V-shaped frame, means for detachably securing the frame to a vehicle bumper, said means including a crosswise rod supported on the bumper, projecting angular lugs disposed thereon, means for seating one of the transverse brace rods thereon.

2. The combination of claim 1, and a nose shield seated on the angular juncture in the V-shaped top rail, a wheel assembly supported thereby.

3. The combination of claim 2, said superstructure including a vertically spaced transverse elongated rail, support struts to rigidify said vertical placement.

4. A bale loading guide device adapted for attachment to a vehicle and comprising a first V-shaped vertically disposed frame having parallel extensions on the ends thereof, a second V-shaped frame horizontally secured at right angles to the first frame and projecting outwardly therefrom to define a passageway therewith, a caster unit carried by the nose of said second frame, said nose of the second frame projecting beyond the nose of the first frame, and means for detachably securing said frame to one end of a vehicle so that the noses thereof project outwardly from the vehicle.

5. A bale loading guide device adapted for attachment to a vehicle and comprising a first V-shaped vertically disposed frame having parallel extensions on the ends thereof, a second V-shaped frame horizontally secured at right angles to the first frame and projecting outwardly therefrom to define a passageway therewith, a caster unit carried by the nose of said second frame, said nose of the second frame projecting beyond the nose of the first frame, means for detachably securing said frame to one end of a vehicle so that the noses thereof project outwardly from the vehicle, and a superstructure mounted on said frames and including a vertical rod disposed through the nose of the second frame and a transverse horizontally disposed rod mounted on the upper end of the vertical rod, the ends of said transverse rod extending beyond and in advance of the noses of the frames.

6. The combination of claim 4, wherein said securing means includes a support member transversely secured to one end of the vehicle, attaching members associated with said member, a transversely disposed brace rod connected to said frames, a connecting pin adapted to engage said attaching members and associated with said brace rod for securing the same to the support member.

7. The combination of claim 4, wherein said securing means includes a resilient shock absorbing connection.

MILLARD M. ROSSITER.

REFERENCES CITED

The following references are of record in the file of this patent:

UNITED STATES PATENTS

| Number | Name | Date |
| --- | --- | --- |
| 1,964,617 | Bird | June 26, 1934 |
| 2,290,060 | Massey | July 14, 1942 |
| 2,431,410 | Maxim | Nov. 25, 1947 |
| 2,466,555 | Paine et al. | Apr. 5, 1949 |